United States Patent [19]
Schow et al.

[11] 3,867,769
[45] Feb. 25, 1975

[54] ARC WELDING SIMULATOR TRAINER

[76] Inventors: Harvey B. Schow, 2320 1/2 Brant St., San Diego, Calif. 92101; Macy L. Abrams, 4717 Baylor Dr., San Diego, Calif. 92115

[22] Filed: Aug. 6, 1973

[21] Appl. No.: 385,947

[52] U.S. Cl.................. 35/13, 219/130, 219/131 R
[51] Int. Cl. .......................................... G09b 25/02
[58] Field of Search........ 35/8 R, 9 C, 10, 13, 19 R, 35/19 A, 22 R, 25, 36, 37; 219/130, 131 R

[56] References Cited
UNITED STATES PATENTS

| | | | |
|---|---|---|---|
| 1,286,529 | 12/1918 | Cave | 35/8 R |
| 2,860,422 | 11/1958 | May | 35/9 C |
| 3,029,526 | 4/1962 | Olalainty | 35/22 R |
| 3,562,927 | 2/1971 | Moskowitz | 35/22 R |
| 3,673,708 | 7/1972 | Bevens | 35/37 |

FOREIGN PATENTS OR APPLICATIONS

| | | | |
|---|---|---|---|
| 54,931 | 1943 | Netherlands | 35/8 R |

*Primary Examiner*—Robert W. Michell
*Assistant Examiner*—Vance Y. Hum
*Attorney, Agent, or Firm*—R. S. Sciascia; G. J. Rubens

[57] ABSTRACT

An arc welding simulator is provided for teaching welder trainees how to arc weld quality welds resulting in significant savings of time and material. Specifically, the simulator provides immediate, discriminative feedback and the capacity for concentrated practice, both learning qualities lacking in the welding process.

17 Claims, 10 Drawing Figures

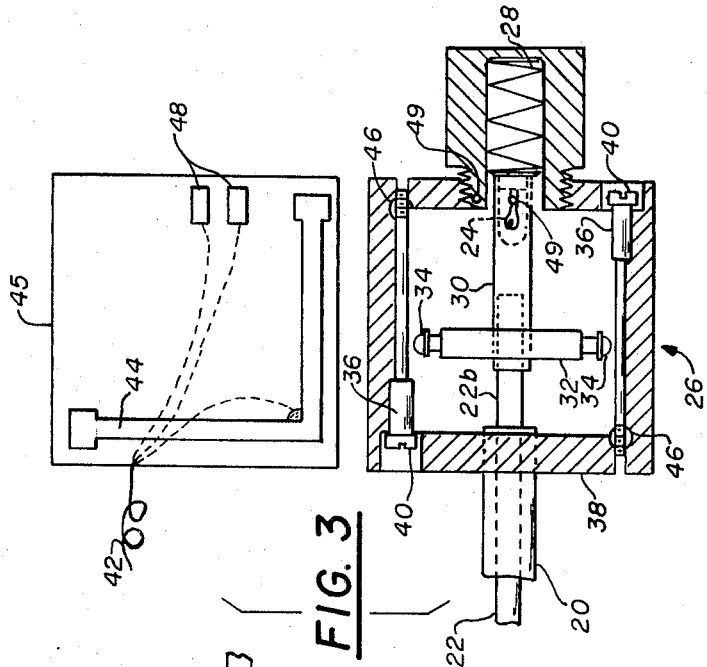
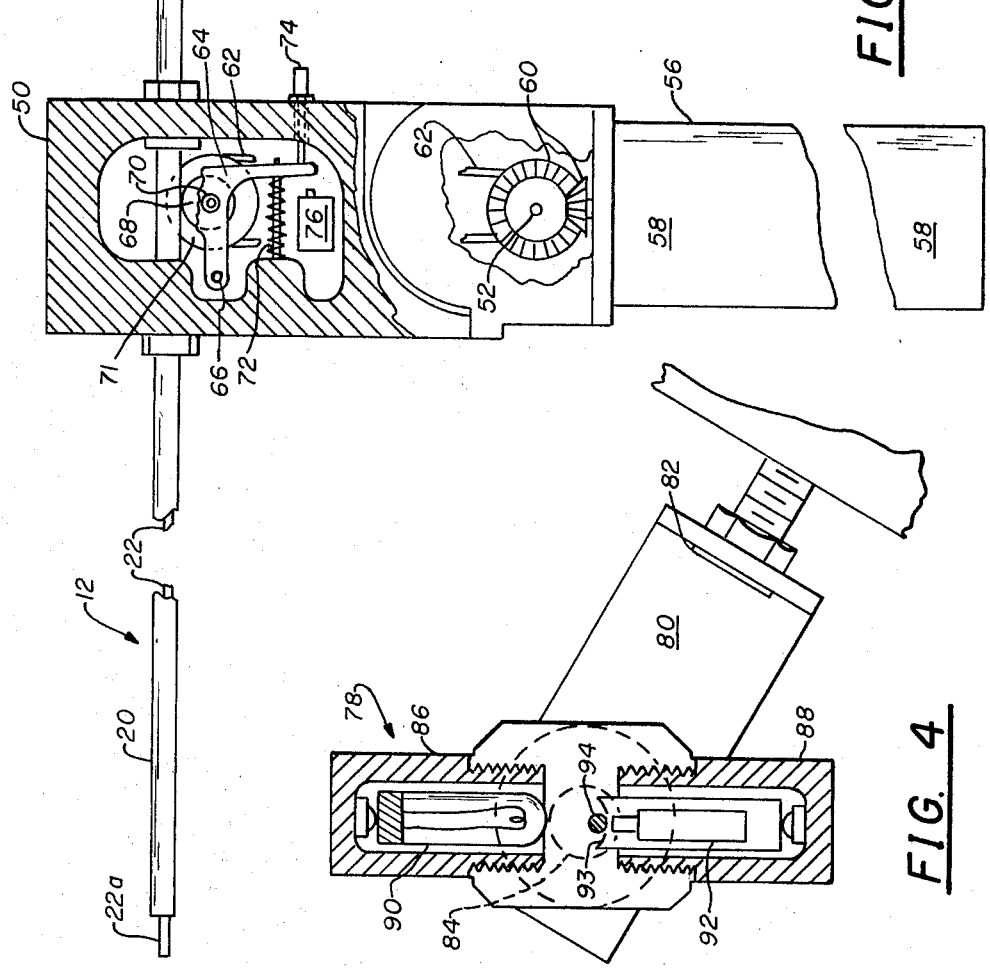
FIG. 3
FIG. 2
FIG. 4

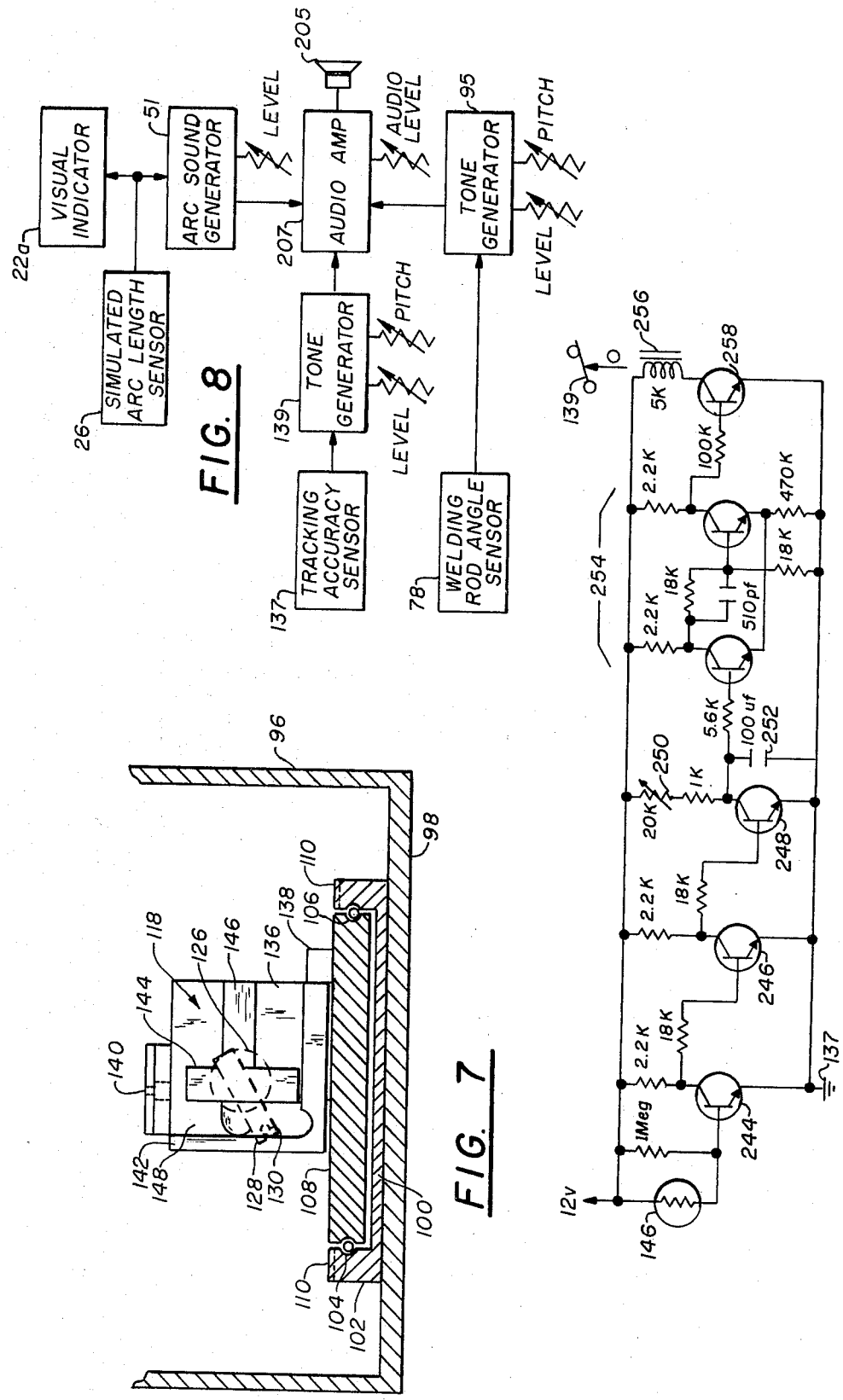

ARC WELDING SIMULATOR TRAINER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to welding equipment and more particularly to an arc welding simulator for teaching a user the various psychomotor skills, but it is understood that the invention can be used for any purpose for which it is rewelding applicable.

The long established method for training welders to obtain quality welds consists essentially in their performing the actual welding operation. That is, the trainee is given a workpiece to weld and, thereafter, corrects his mistakes by chipping, grinding and rewelding. Whereas it usually takes a trainee only one minute to weld a pass, it may require from ten minutes to over an hour for him to correct his mistakes. This time honored training method is time consuming and excessively expensive in materials, equipment, and time of instructors. It has been estimated that the cost to the Navy in training an individual operator using the conventional method amounts to over &8,000.

The inventors have observed that the welding operation is a process by which certain factors are incorporated in behavior patterns of the learner despite a complex stimulus situation, interference from mistakes and previous habits, and inadequate feedback. The acquiring of welding skills involves the trainee learning to make the right physical movement to a particular cue situation, but the cue situation is a result of the movements the trainee just made. The cue situation consists of exteroceptive feedback from aspects of the welding process and proprioceptive feedback, both of which are a result of previous movements of the trainee. If the trainee's inability produces a cue situation grossly different from that desired, he cannot be learning the stimulus-response relationship of good welding.

In the current welding training process, the instructor is limited in his ability to correct the trainee and provide him with adequate feedback. Firstly, his span of visibility is severely restricted by the welding helmet (and appropriate filters) he must wear to protect himself from the intense flame and sparks which are part of the welding process. Secondly, the active welding puddle is so small (⅛ inch) that the trainee, in assuming the correct welding posture, substantially blocks visibility of the puddle to the instructor. Accordingly, the principal feedback available to the trainee is from radiographic inspection of completed welds and these radiographs may not be available for days. Thus, in the current method of teaching quality welding, the trainee gets minimal feedback as to the correctness of his welding movements, and he often spends hours practicing and reinforcing bad behavior patterns without being aware of his mistakes.

SUMMARY OF THE INVENTION

A welding training simulator is provided for teaching a trainee how to arc weld quality welds. In addition to being especially suitable for beginning trainees, the apparatus can also be used to retrain or provide practice for experienced welders who periodically must requalify but are not able to practice actual welding due to their assignments (e.g., on board submarines). The apparatus can also be used as a quantitative measuring device to select men with the greatest potential for success in welding schools. The apparatus consists of three major units: (1) a motor-driven device which is similar in form, weight, and purpose to an actual electrode holder (stinger) and the consumable electrode (rod); (2) a motor-driven target which represents the welding path; and (3) a control box containing error sensors and recorders with the associated electronics for immediate operator feedback. The apparatus integrates a plurality of critical factors into one simultaneous and continuous operation, in which there is a suitable sensor for each factor to provide a distinguishable feedback signal back to the trainee. The sensors have adjustable parameters to "shape" welding behavior (i.e., a gradual progression to complex behavior repertories through successive approximation) or to "fade" stimulus support through gradual withdrawl thus making the trainee dependent on proprioceptive and exteroceptive cues once the skill is acquired. For example, one important factor in the welding process is the maintenance of a proper angle of the electrode with respect to the workpiece. Accordingly, an angle detector is mounted on the simulator's welding rod holder and is designed to cause the emission of an audible signal to the operator when the angle parameters are exceeded during his welding pass. The angle detector is adjustably mounted to account for any directional orientation of the simulated workpiece (e.g., overhead or vertical welding). Another welding factor provided in the apparatus is the maintenance of a proper arc length. When the simulator trainee fails to maintain the proper arc length in either direction (nominally ⅛ inch), the electrode stops receding, the electronically generated "crackling hissing" sound which resembles that of a burning electrode terminates, and the light which corresponds to arc illumination extinguishes. These go/no-go qualities simulate the natural welding environment in that: (1) an excessive short arc results in the electrode becoming stuck in the puddle and, (2) an excessively long arc results in the loss of the arc. Still another critical welding behavior is that of puddle manipulation. To develop the proprioceptive cues resulting from the side-to-side motion used in most quality welding, the simulator track duplicates the precise dimensions and speed required to produce a quality weld. The speed and pattern of the target can be adjusted to account for different types of surfaces (e.g., pipe and plate), materials, thicknesses, and welding motions other than side-to-side. The trainee aims the stinger-electrode at the track and any deviation from the side-to-side motion results in a feedback tone. While the trainee follows, rather than initiates, these movements as he would in the actual welding situation, simulation provides the opportunity for repeated exposure to the proprioceptive cues that would be received only after the trainee had learned to weld. Much of the reinforcement of incorrect behavior is thus eliminated and the trainee can spend his time in the correct stimulus condition. A reset button is provided on the stinger to enable the operator to recycle both the stinger and target for succeeding welding passes.

Thus, throughout the training operation, all the critical factors in the welding behaviors are simultaneously accounted for and instantaneous feedback signals are provided to the operator to indicate the correctness of his movements at all times. An important feature of the invention resides in a variable control over the degree of responsiveness of each of the feedback signals so that the welding tasks can be made more difficult as the operator's proficiency increases in the training process.

STATEMENT OF THE OBJECTS OF THE INVENTION

An important object of this invention is to provide an apparatus for training welders that is most efficient and economical, and which will reduce the training time period and permit uninterrupted practice.

Another important object is to provide a training apparatus that will simulate all of the critical physical parameters involved in the welding operations; and a corollary object is to provide an adjustable sensor-feedback system for each of said parameters to make the operator aware that he has exceeded the limits set for any one of said parameters and to allow the instructor to shape his welding behaviors fade stimulus support.

Still another object is to provide a welding training simulator that is portable, can be used in any environment, eliminates the need for expensive metals, electrodes, etc., does not require heavy-duty power sources, and an apparatus in which the limits for the various parameters can be varied to train the operator for all the different welding situations.

A further object is to provide a quantitative measuring device to select men with the greatest potential for success in welding schools, and a corollary object is to provide a quantitative measuring device to select men with the greatest potential for success in the psychomotor skills.

A still further object is to provide an apparatus which demonstrates that a simulator can be used to train certain psychomotor skills more effectively than performing the actual task itself.

Other objects, advantages and novel features of the invention will become apparent from the following detailed description of the invention when considered in conjunction with the accompanying drawings.

BRIEF DESCRIPTION OF THE DRAWINGS

FIG. 2 is an enlarged elevation view of the stinger showing the details of the welding rod drive mechanism and its controls.

FIG. 3 is a cross-sectional view of the length-of-arc limit switch on the upper end of the simulated welding rod and also showing the electrode light source. The limit switch cover is inverted to show the printed circuitry on the underside.

FIG. 4 is an enlarged longitudinal sectional view of the electrode angle detector showing the details.

FIG. 7 is a cross-section taken along line VII–VIII of FIG. 6 showing the details of the carriage mounting and the zig-zag adjustment of the target.

FIG. 8 is a schematic block diagram of the various welding factor sensors and feedback circuits.

FIG. 10 is a circuit diagram of the tracking accuracy sensor.

DESCRIPTION OF THE PREFERRED EMBODIMENTS

Figure 1:
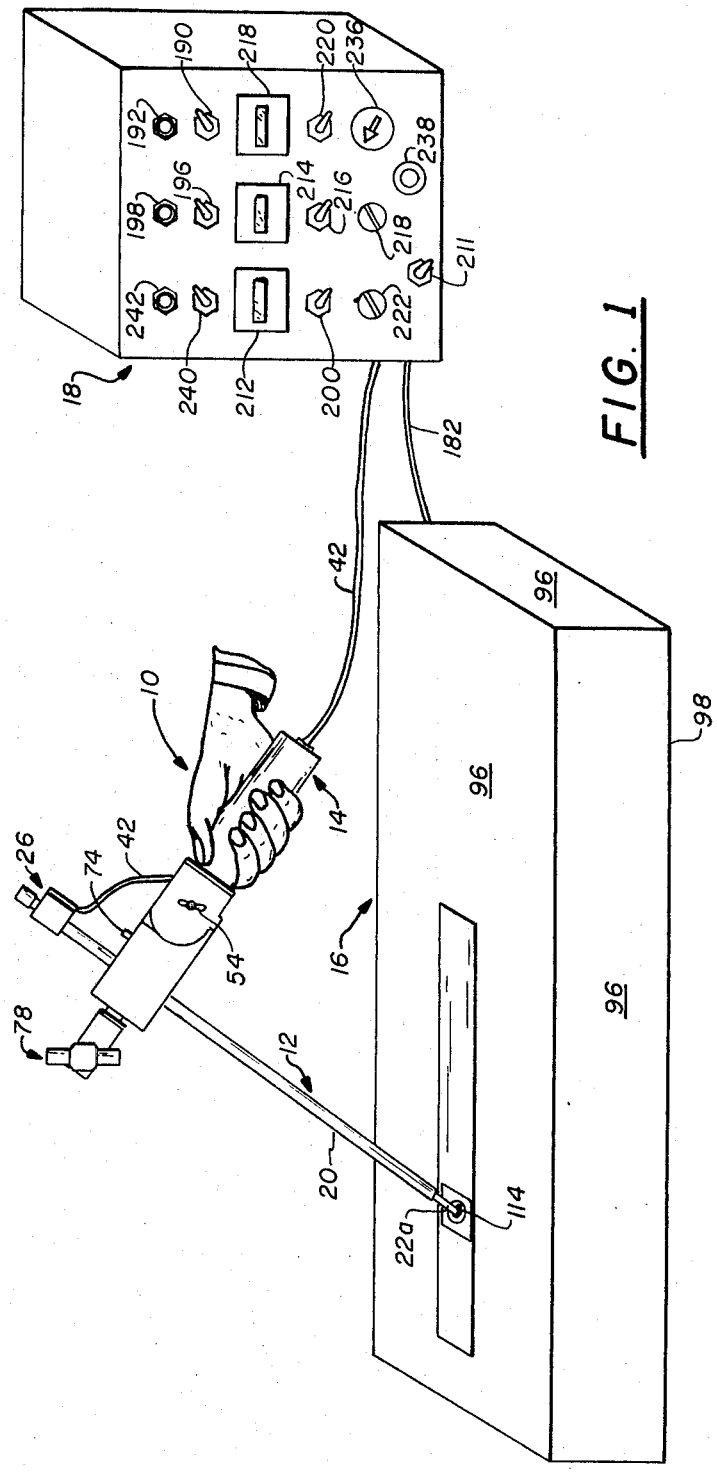
FIG. 1 is a perspective view of the welding simulator showing the general arrangement of the principal components.

Referring to the drawings where like reference numerals refer to similar parts throughout the figures there is shown in FIG. 1 a general arrangement of the novel welding training simulator 10 which comprises a simulated welding rod 12, a welding rod holder 14, a target track mechanism 16, and a monitor and electrical circuit control box 18.

The above mentioned simulated components of actual welding equipment and their sensors will be described separately in detail to be followed by a description of the complete operation.

Welding rod 12 shown in detail in FIGS. 2 and 3 comprises an elongate metal tube 20 housing slidable inner clear plastic rod 22 which is adapted to project beyond both ends of the tube. Tip portion 22a represents the simulated length of the welding arc from the tip of the welding rod to the work surface. The opposite end 22b of the rod projects from the other end of the tube 20 and its edge illuminated by a bulb 24 when energized through a limit switch 26. Plastic rod may be continuous from one end to the other or separate end portions may be suitably secured in tube 20. Limit switch 26 acts as an arc-length sensor in a manner to be described. When plastic rod 22 is continuous, tip 22a is biased to an outermost position by a compression spring 28 via a shoulder on bulb 24 and a metal sleeve 30 fixedly attached to the rod. A central cross arm 32 is fixed to sleeve 30 and carries a pair of oppositely disposed contacts 34 adapted to engage a pair of spaced contacts 36 mounted to the inner walls of plastic casing 38.

The longitudinal distance between contacts 36, being bridged by contacts 34 upon longitudinal movement of welding rod 22, represents the allowable preset length of the simulated welding arc. Each contact 36 is adjustably mounted on a screw 40 for varying its position with respect to the corresponding movable contacts 34, enabling the simulated arc length to be adjusted according to the material composition of the welding rod and workpiece and the proficiency level of the operator.

Contacts 36 are electrically connected to cable 42 via a printed circuit supported on the inside of casing cover 45 including bus bar 44 which makes electrical contact with spring loaded metal posts 46 through which the respective adjustment screws are theaded. Contacts 34 and 36 are electrically connected in the circuit of FIG. 9 to control an audio signal, as will be described under "Operation." A pair of contacts 48 provide an electrical circuit to energize bulb 24, via small compression springs, not shown, mounted in suitable openings 49 in the limit switch housing.

Figure 9:
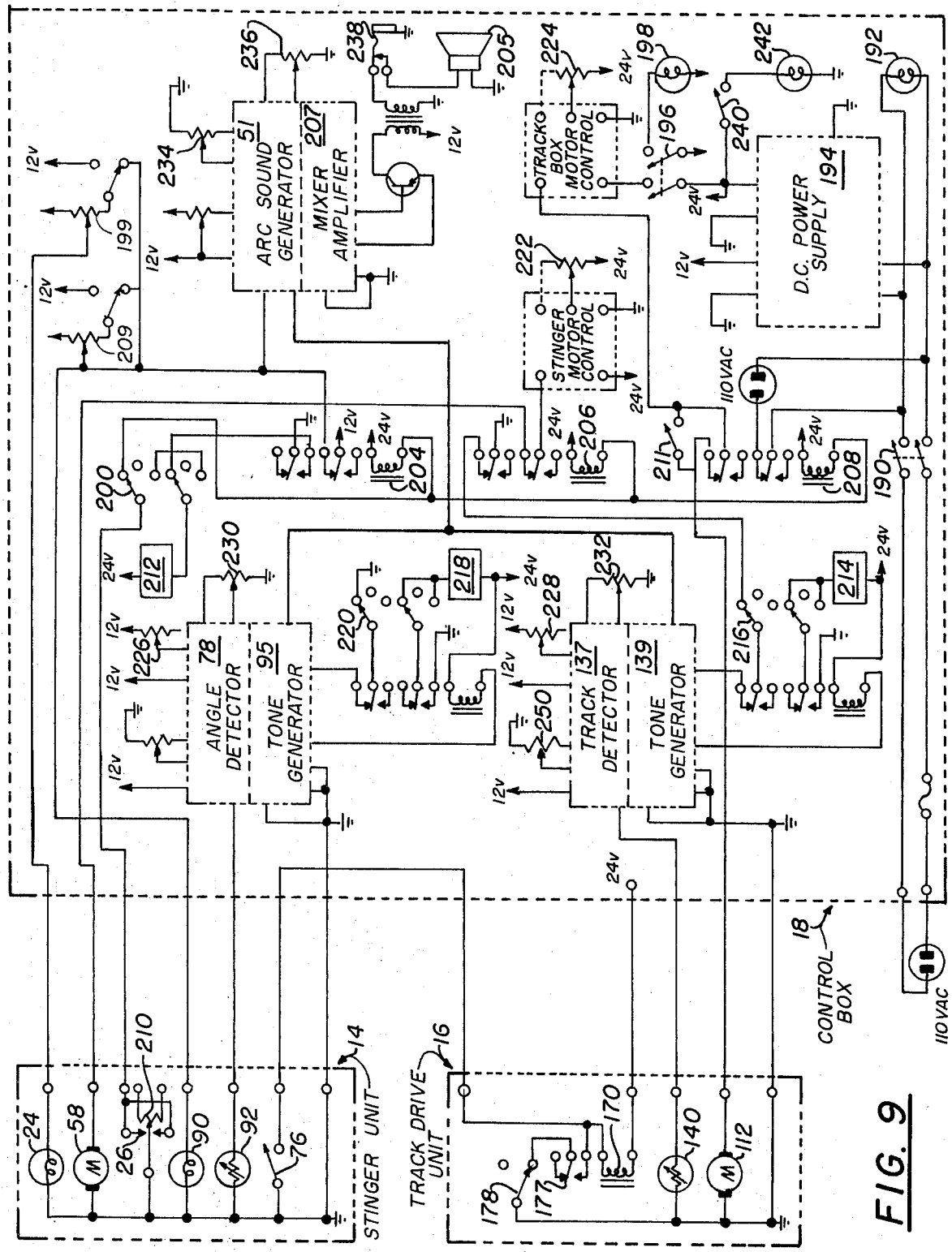
FIG. 9 is a detailed wiring diagram of the welding simulator.

During the welding run, as long as the operator maintains the proper arc length, contacts 34 and 36 will be disengaged, as illustrated in FIG. 3, and bulb 24 is energized to illuminate rod tip 22a providing a visual indication to the operator, and providing signals to control stinger 14 and target mechanism 16. Whenever the operator fails to maintain the proper arc length, contacts 34 will engage either of contacts 36, depending on whether the simulated arc is too long or too short. This causes rod illumination to be turned off and de-energizes an audio signal to the operator from sound generator 51 (FIG. 9). Simultaneously, the feeding movement of the welding rod 12 and the target movement in mechanism 16 is stopped.

The details of welding rod holder or stinger 14 are best illustrated in FIG. 2, and comprises a two-piece housing 50 adjustably articulated at pivot 52 by means of a thumb screw 54 (FIG. 1). A handle portion 56 houses a variable speed DC motor 58, the operation of which is controlled by the arc length limit switch 26 and control box 18.

Motor 58 through a pair of bevel gears 60 and a belt 62 provides the drive mechanism for shortening the welding rod 12 and simulates electrode consumption during the welding operation. Welding rod 12 freely projects through the upper end of stinger housing 50. A bifurcated bell crank 64 is pivotally mounted at one end by pin 66 to the stinger housing. A rubber roller 68 on shaft 70 is mounted intermediately on bell crank 64 and is adapted releasably to engage welding rod 12. A pulley 71 is also mounted on shaft 70, and by means of belt 62 rotates roller 68. Bell crank 64 is biased by compression spring 72 to a position where roller 68 frictionally engages welding rod 12 in driving engagement to draw the welding rod through the stinger to simulate rod consumption. Bell crank 64 is biased by spring 72 to bear against one end of a reset button 74 conveniently located on the exterior of the stinger housing. Slight thumb pressure by the operator on button 74 causes bell crank 64 to pivot, compressing spring 72, to disengage roller 68 from welding rod 12. Releasing the welding rod enables it to be repositioned within the stinger, after it has reached a fully consumed position to enable continued welding. or at any other time. Additional thumb pressure by the operator on reset button 74 causes bell crank 64 to engage and close a microswitch 76 which resets or recycles the target mechanism 16 to start a new welding pass in a manner later to be described.

A welding rod angle detector or sensor 78 is provided to signal the operator when he is positioning the welding rod at an incorrect angle with respect to the workpiece (see FIGS. 1 and 4). Sensor 78 is mounted on stinger housing 50 by means of a right angle bracket 80. One arm of bracket 80 is pivotally mounted on the stinger housing at 82 to provide adjustment about a longitudinal axis of the stinger, and sensor 78 is pivotally mounted at 84 to the other bracket arm to provide an adjustment about a transverse axis. These adjustments enable the instructor to position detector 78 in accordance with the desired orientation. In the crossectional view of sensor 78 in FIG. 4, the hollow metal housing is threaded at opposite ends to receive caps 86 and 88. Cap 86 houses a suitable light source 90, i.e., a 12V bulb, and as the bulb may require frequent replacement, cap 86 can be suitably identified to distinguish it from cap 88. Cap 88 houses a photocell 92 arranged to receive the light rays from bulb 90. Also mounted in cap 88 between bulb 90 and photocell 92 is a concave dish 93 supporting a freely movable opaque ball 94. When the detector is maintained in the appropriate orientation, illustrated in FIG. 4, during the welding operation, ball 94 is substantially centrally oriented on dish 93 to block from photocell 93 any light from bulb 90.

Whenever the operator during the welding operation incorrectly positions the stinger beyond the preset limits, i.e., ±5°, ball 94 is caused to roll off the central location allowing the light to energize the photocell which in turn actuates a tone generator 95 (see FIG. 9) causing an audio tone to be presented to the operator to make him aware of his faulty welding technique. The curvature of dish 93 determines the preset limits of ±5°, and the dish can be replaced to provide different limits if desired by the instructor.

Figure 6:
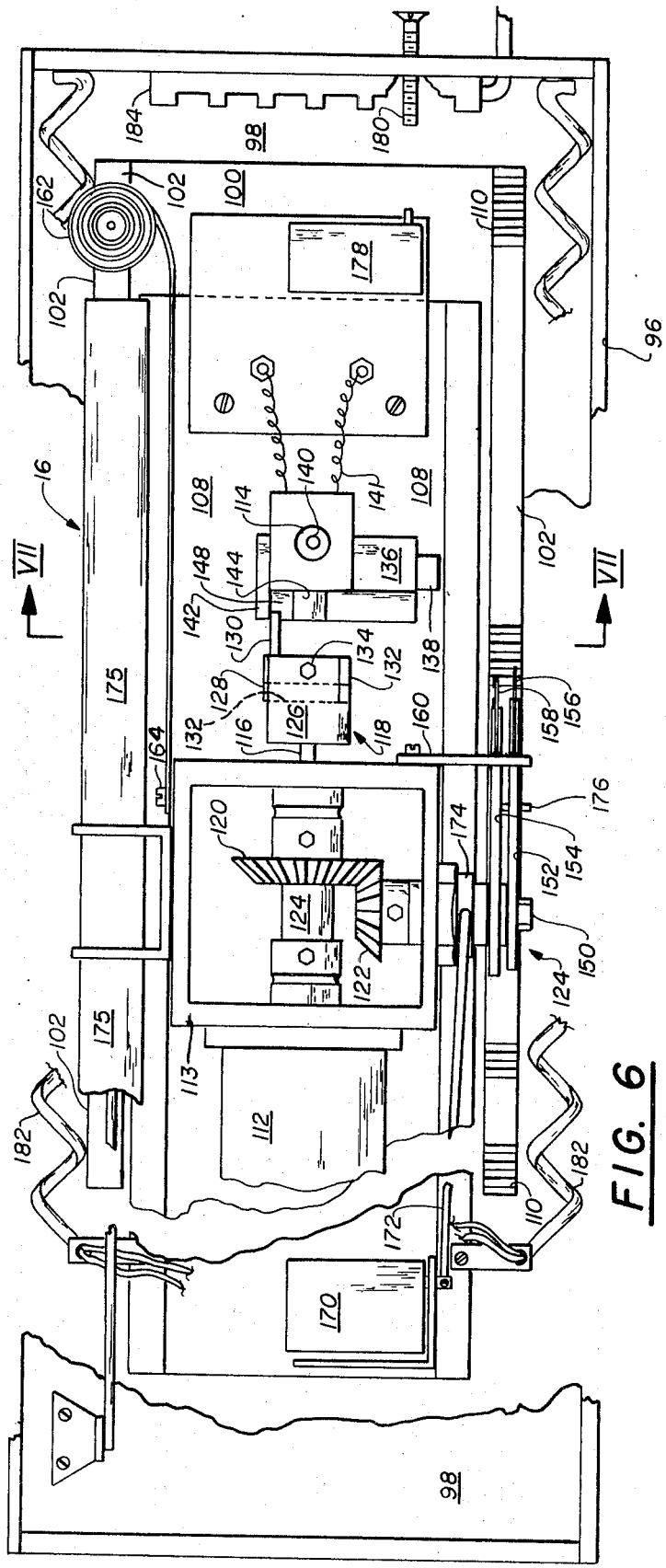
FIGS. 5 and 6 are side elevation and top views, respectively, of the target track mechanism with the housing cover removed.
Figure 5:
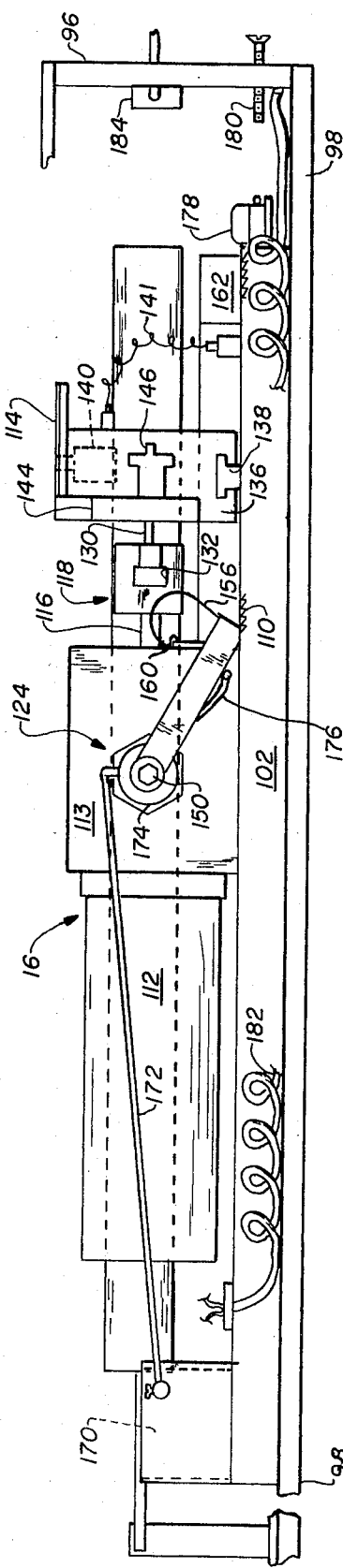

The simulated workpiece is represented by the target track mechanism 16, shown in detail in FIGS. 5–7. The target track mechanism serves to provide the operator with a simulated workpiece in the form of a target which is given a zig-zag motion to simulate a proper arc welding path.

Target track mechanism 16 comprises a housing 96 which can be detachably mounted on any horizontal or vertical wall or any other orientation to simulate various actual welding environments. Housing 96 has a base on which is bolted a carriage bed having spaced raised rails 102 the lateral sides of which have grooves 104 (FIG. 7) for ball bearing engagement with opposed grooves 106 in a carriage 108. The top of one of rails 102 is formed with an integral rack having teeth 110 for advancing carriage 108 longitudinally. being one of the movements in the welding path.

It should be noted that in the illustrated embodiment the carriage is provided with a longitudinal rectilinear movement to simulate a straight welding pass; however, for example, the carriage could be provided with a curvilinear movement to simulate the welding path around a circular pipe or the like.

A DC motor 112 is end supported to a gear box 113 mounted on carriage 108, the motor being the power source for the various motions given to target 114 as will be described. A motor shaft extension 116 directly drives an eccentric drive 118, as will be described, for providing the zig-zag motion to target 114, and by means of a pair of bevel gears 120 and 122 drives the rack drive mechanism 124, for providing carriage 108 with longitudinal motion.

Eccentric drive 118 includes a drum 126 concentrically mounted on shaft extension 116, on which is supported a transversely movable arm 128 having a T-shaped cross-section from which longitudinally projects a cam pin 130. Arm 128 is slidable in a corresponding transverse groove 132 in drum 126 and is adjustably secured in any selected position by a lock screw whereby the eccentric throw of pin 130, and, therefore, the transverse swing of target 114, can be varied in magnitude. The zig-zag movement of target 114 prescribes a correct path for the operator to follow with the welding rod tip 22a to achieve a proper weld puddle.

It should be noted that in an actual welding operation, the operator generates a zig-zag motion pausing momentarily at the end of each sidestroke to enable a build-up of the puddle. This apparatus stimulates this movement by the zig-zag motion provided to target 114.

Puddle target 114 is supported on top of a cam block 136 transversely slidable on a T-shaped rail 138 anchored to carriage 108. A photocell 140 is supported in cam block 136 to be visible through the center of target 114. Photocell 140 is energizable by light emitted from welding rod tip 22a. Whenever the operator fails to correctly follow the target throughout its oscillating path, photocell 140 will be de-energized via flexible leads 141 to energize a tone generator 139 (FIGS. 8 and 9) to notify the operator that he is failing to follow the prescribed target path by drifting off the moving target. A tracking accuracy sensor circuit 137 (FIG. 10) processes the signal from photocell 140 to the tone generator 139 by introducing an adjustable time delay to provide a sensitivity variable in the tracking operation in accordance with changes in tracking proficiency.

Cam block 136 is provided with a vertical fixed shoulder 142 and an adjustable shoulder 144 slidable in a transversed T-shaped groove 146 in the cam block. Shoulders 142 and 144 provide an adjustable sized slot 148 in which camming pin 130 oscillates when driven by motor 112. The width of slot 148 basically determines the amount of pause of the target at the end of each zig-zag stroke, which depends on several real welding variables, e.g., type of base material, thickness of base material, electrode material, etc.

The amount of eccentricity of camming pin 130 basically determines the width of the zig-zag stroke, which also depend on similar variables. However, both adjustments interact and are dependent on each other. During the reciprocating motion of the cam block and target 114 as described above, carriage 108 simultaneously is provided with a longitudinal stepped motion by rack drive mechanism 124.

Bevel gear 120 is integrally mounted on motor shaft extension 116 and drives a mating bevel gear 122 having a shaft 150 rotatably supported on gear box 113. A pair of pawls 152 and 154 are eccentrically mounted in adjacent positions on shaft 150 at a 180° out-of-phase relation. The pawls are adapted to alternately engage rack teeth 110 to advance in steps the carriage-supported target. A pair of leaf springs 156 and 158 bias the pawls into engagement with rack teeth 110, an upper end of each spring being secured in a cross piece 160 supported on gear box 113, and a lower end bearing against the free end of the respective pawls. A constant tension coil "negator" type spring 162 is mounted on carriage bed 100 with an end of the spring attached to the carriage at 164. Spring 162 biases carriage 108 to the right side of the housing (as seen in FIG. 5 and 6) which is the start of the welding pass. When carriage 108 reaches the end of the welding pass, to the far left side of the housing, it can be returned to the starting position by the operator fully depressing reset button 74. This action closes switch 76 which energizes solenoid 170 mounted on carriage 108. Link 172 operated by the solenoid moves to the left (FIGS. 5 and 6) rotating collar 174 around crank shaft 150. An integral finger 176 on collar 174 lifts the free ends of both pawls 152 and 154 out of engagement with rack teeth 110, and the entire carriage is propelled by spring 162 back to the starting position. Throughout the return stroke of the carriage, the solenoid remains in an energized state by means of a pair of holding contacts 177 (FIGS. 6 and 9). A buffer mechanism 175 connected between base 98 and carriage 108 absorbs any shock of the carriage return under the tension of spring 162. At the end of carriage movement to the right limit switch 178 mounted on carriage 108 engages an adjustable stop 180 on the housing wall which de-energizes holding contacts 177 and solenoid 170, releasing finger 176 to allow the pawls to be spring biased into engagement with rack teeth 110. The carriage is now in position to start a new welding pass.

The electrical connections for motor 112, solenoid 170 and limit switch 178 are encased in a pair of flexible coiled cables 182 connected to a terminal block 184 mounted to the inner end wall of housing 96.

OPERATION

The operation of each of the aforementioned sensors and their associated simulated welding training equipment component will be described separately and with reference to the circuit diagrams in FIGS. 9 and 10 and control box 18 in FIG. 1.

The welding simulator is first activated by the instructor or the trainee-operator by throwing a toggle power switch 190 which activates a corresponding light 192 on the face of control box 18. Line voltage (110V AC) is applied to DC power supply 194 which furnishes 12V DC power to operate the various transistor circuits, and 24V DC power to operate the various motors, relays, and lights. Throwing of track toggle switch 196, indicated by light 198, energizes target track mechanism 16, and puddle target 114 commences its zig-zag tracking path.

The operator manually grasps stinger 14 and commences his welding pass by engaging target 114 with welding rod tip 22a. Whenever the operator fails to maintain a correct arc length within the limits set in by the instructor, illumination of tip 22a is shut off, stinger motor 58 is de-energized, and arc sound generator 51 is de-energized via limit switch 26, switch 200 and relays 204, 206, and 208.

It should be recalled that stinger motor 58 functions to shorten gradually the length of welding rod 12, as shown in FIG. 2, to simulate consumption of the welding rod that normally occurs in an actual welding environment. When rod 12 is thus consumed, its full length can be restored by partially depressing reset button 74. Thus, when the proper arc length is not maintained, the feeding of the welding rod through the stinger is stopped, the rod tip illumination and arc sound generator are turned off, notifying the operator of error in maintaining a proper arc length.

Relay 204 energizes bulb 24 and arc sound generator 51, electrically connected to speaker 205 via mixer-amplifier 207. Potentiometer 199 varies the intensity of bulb 24 to provide an adjustment of the responsiveness of this sensor circuit in accordance with the particular proficiency level of the operator. It should be noted that sound generator 51 is designed to emit a hissing sound to simulate the sound generated by an actual welding arc. A potentiometer 210, diagrammatically illustrated in conjunction with limit switch 26, varies the pitch of the hissing sound in accordance with the changes in arc length. Thus, the operator is made aware of his error in arc length by visual signal, and an absence of an audio signal as well as whether his arc length is short or long depending on the pitch of the audio signal.

Switch 200 provides a capability for the operator to practice without any feedback signal from the arc length sensor. An additional training option is provided by switch 211 which enables the track motor 112 to continue operation or to be stopped whenever the arc length error sensor 26 is activated. Each time the operator fails to stay within the predetermined arc length limits his errors are cumulatively recorded by counter 212 on the face of control box 18. Counter 212 will also operate even though switch 200 is thrown during practice operation.

Upon energization of track motor 112, puddle target 114 is provided with a zig-zag motion, the characteristics of which have been predetermined and preset by the instructor. Whenever the operator fails to illuminate photocell 140 by maintaining welding rod tip 22a on the target, tone generator 139 (FIGS. 8 and 10) is energized through detector circuit 137 to emit another distinctive tone from speaker 205 via mixer-amplifier 207. His tracking errors are accumulatively displayed at counter 214 on control box 18. A toggle switch 216 can be thrown to silence the track error audio signal, although counter 214 may continue to record the errors. However, the track motor 112 is unaffected by the existence of the tracking errors and continues to drive the target 114 in its zig-zag path.

Whenever the target 114 reaches the end of its travel, or at any other time at the will of the operator, he can fully depress reset button 74 to energize track reset solenoid 170 and recycle the carriage as previously described.

An additional welding factor to be sensed during the above described simulated welding operation, is whether the operator is holding welding rod 12 at the angle prescribed by the instructor. The sensing of this factor is accomplished by welding rod angle detector 78. Improper orientation of the rod causes photocell 92 (FIG. 4) to be energized which in turn activates tone generator 95 (FIGS. 8 and 10) through detector 78 to emit a sound signal from speaker 205 via mixer-amplifier. These angle errors are accumulatively displayed at counter 218. A potentiometer 209 varies the light intensity of bulb 90 to provide an adjustment of the responsiveness of this sensor circuit in accordance with the particular proficiency level of the operator. A toggle switch 220 can be thrown to silence the angle error tone, although counter 218 may continue to record the number of errors. Since in the actual welding process, an improper angular positioning of the welding rod does not interrupt the welding prcoess, as does for instance improper arc length, any additional feedback signal other than the audio tone is not desired. Whereas potentiometer 210 provides direction guidance to the operator as to the degree of error in sensing arc length by varying the tonal qualities of the sound signal to match the real arc sound variations, similar circuitry may be provided to provide directional guidance in the welding rod angular sensing circuit and the track error sensing circuit.

Additional controls are provided in the circuitry in FIG. 9, such as stinger motor control 222 for varying the rate of welding rod consumption in accordance with different compositions of welding rods. Control 224 varies the speed of track motor 112 in accordance with different workpiece materials. Pitch control potentiometers 226 and 228 are provided for angle tone generator 95 and track tone generator 139, respectively, to ensure adequate distinction to the operator between these sound signals. Mixer potentiometers 230, 232 and 234 (located on back of control box 18) are provided to match the volume levels of the sound output of the three sound generators to the mixer-amplifier 207. Control 236 adjusts the overall volume level of speaker 205.

Headphone jack 238 enables the operator to substitute earphones built into the welder's mask in lieu of speaker 205 to minimize interference between operators in close proximity.

A call switch 240 and light 242 are provided on the face of control box 18 to enable the operator to seek instructor assistance.

An important aspect of the sensor feeback system is to provide a control over the responsiveness of the feedback signal, such as by an adjustable delay in the feedback signal, so that the signal can be controlled in direct relation to the operator's proficiency. In other words, as the operator gradually improves his proficiency in the training process, the degree of responsiveness of the feedback signal can be manually controlled by the instructor or the operator to be increased correspondingly to make the respective behavior pattern more demanding and thus compel the operator further to enhance his skill.

In the instant invention such a feedack control is provided in the circuitry involving all the aforementioned behavior patterns in the welding process. FIG. 10 illustrates the feedback circuit for tracking accuracy sensor 137, and it should be noted that a similar circuit is utilized in rod angle sensor 78 and need not be illustrated.

When the operator fails to follow puddle target 114 with welding rod 20, photocell 140 is de-energized by the absence of light from tip 22a. This causes transistor 244 to switch off, transistor 246 to switch on, and transistor 248 to switch off. 12-volt power is thus applied to a time delay circuit including variable resistor 250 and capacitor 252, charging the latter at a rate determined by the setting of variable resistor 250. When the voltage across capacitor 252 reaches a given value, Schmitt trigger 254 is instantaneously energized to control relay 256 via transistor 258, which in turn activates tone generator 139 to initiate the tracking feedback signal to the operator. To achieve a maximum delay of one second in the presentation of the tracking error signal, the value of resistor 250 is 20K ohms, and capacitor 252 is 100 mf.

The instructor by manipulating variable resistor 250 (located on the back of control box 18 to be inaccessible to the operator) can vary the degree of responsiveness of the feedback signal, and the proficiency of the operator, for the training purpose described above.

A similar change in the responsiveness of arc length sensor 26 can be accomplished by adjusting screws 40 in limit switch 26 (FIG. 3) to vary the limits of the switch operation and the range of allowable arc length.

The above-described welding training simulator enables a welding operator, either a trainee or experienced welder in need of re-certification, to practice the various psychomotor skills involved in the welding process. Each of the component welding behaviors involved have an immediate feedback signal, audio and-/or visual, to advise the operator as to his proficiency in accordance with pre-set limits. Such limits can be varied by the instructor to both "shape" welding behavior and to "fade" stimulus support by controlling the responsiveness of the feedback signals such as by the delay circuit in FIG. 10.

Obviously many modifications and variations of the present invention are possible in the light of the above teachings. It is therefore to be understood that within the scope of the appended claims the invention may be practiced otherwise than as specifically described.

What is claimed is: telescopically

1. An arc welding simulator for teaching an operator the various motor skills comprising:

a work surface componet including a movable simulated welding puddle;

means for moving said puddle with a predetermined movement simulating a weld path;

a welding rod holder component to be manually manipulated by the operator relative to the work surface component;

a simulated welding rod component movably supported by said holder for following said movable puddle;

means for moving said welding rod relative to the holder at a rate simulating consumption of the welding rod;

means on the welding rod for sensing the distance between the end of the welding rod and the puddle which distance comprises a simulated arc length;

said components providing practice for the behavior skills involved in the welding process; and sensor circuits operatively connected to selected components for providing immediate feedback signals to the operator indicative as to his proficiency in the various behavior skills during his simulated welding pass.

2. The simulator of claim 1 wherein the means for moving said welding rod is controlled by the length of arc means whereby movement of the welding rod can be stopped whenever the length of arc falls outside a predetermined set of parameters.

3. The simulator of claim 1 wherein the means for moving said puddle is controlled by the length of arc means whereby the motion of the puddle can be stopped whenever the length of arc falls outside a predetermined set of parameters.

4. The simulator of claim 1 wherein said means for simulating the length of arc has a set of parameters the limits of which can be varied depending on the proficiency of the operator.

5. The simulator of claim 1 wherein means are mounted on the holder for detecting the angular divergence of the welding rod with respect to the work surface from a predetermined set of parameters, said means being adjustable about a plurality of axes to account for different orientations of the work surface.

6. The simulator of claim 5 wherein said detector means includes a light source, a photo cell to receive said light source, and a ball supported on a concave surface centrally positioned between said light source and the photo cell, whereby the ball will interrupt said light source and prevent any signal from being generated when the holder is supported within the predetermined set of parameters.

7. The simulator of claim 6 wherein is provided a means for varying the quality of feedback error signal so as to guide the operator back to within the correct preset limits and de-energize said signal.

8. The simulator of claim 1 wherein one of said components includes a radiating energy source, and another of said components has a means responsive to said energy source for controlling the movement of one of said components.

9. The simulator of claim 1 as applies to arc welding wherein said rod terminates at the surface-engaging end with a telesopically movable extension made of light transmitting material simulating the length of arc between the end of the welding rod and the surface, said rod having a light source to illuminate said extension, said extension movable to position a respective feedback sensor having preset parameters as to the allowable length of arc.

10. The simulator of claim 9 wherein said sensor is a limit switch having a pair of contacts, and said extension is movable to position a contact arm adapted to engage said contacts at both ends of its travel, said pair of contacts being adjustable with respect to the contact to change the parameters of the sensor.

11. The simulator of claim 10 wherein said sound generator is inactivated by closing of the limit switch.

12. The simulator of claim 9 wherein said sensor is connected to a sound generator for emitting a hissing sound to simulate the sound generated by an actual welding arc.

13. The simulator of claim 12 wherein means are provided for varying the pitch of the hissing sound depending on the length of the simulated arc length.

14. The simulator of claim 9 wherein means are provided for advancing said puddle target in a predetermined tracking path, said puddle target having a photo cell electrically connected to said advancing means and to a respective feedback circuit, said photo cell being activated by the simulated welding rod whenever the illuminated welding rod extension is maintained by the operator to be in contact with the puddle target, said feedback sensor circuit being maintained in an inoperative condition whenever the photo cell is illuminated.

15. The simulator of claim 14 wherein said photo cell is electrically connected to a sound generator which generates an audio signal whenever the photo cell is deactivated indicating to the operator his tracking error.

16. The simulator of claim 15 wherein is provided a means for varying the quality of feedback error signal so as to guide the operator back to within the correct preset limits and de-energize said signal.

17. An arc welding simulator for teaching an operator the various motor skills comprising:

a simulated work surface component having a movable simulated puddle target;

drive means for moving said target in a zig-zag path;

said target having a light sensitive sensor circuit and a tone generator;

a welding rod holder component to be manually manipulated by the holder;

a simulated welding rod component movably supported by said holder for contact with a surface of said target said target;

said rod terminating at the surface engaging end with a telescopically movable extension capable of transmitting light to energize said light sensitive sensor of the target, said extension simulating the length of arc between the end of the welding rod and the work surface, said rod supporting a light source for illuminating said extension, a feedback sensor, said extension movable to position the feedback sensor having preset parameters as to the allowable length of arc and connected in a circuit with said aforementioned drive means;

said holder having drive means for drawing said rod through the holder to simulate rod consumption;

both of said drive means being connected in a circuit including said length of arc feedback sensor;

whereby failure of the operator to maintain the predetermined simulated arc length will cause the sensor to inactivate said drive means and stop target movement and rod movement.

* * * * *